United States Patent
Silber

(10) Patent No.: US 6,738,041 B2
(45) Date of Patent: *May 18, 2004

(54) USING VIDEO INFORMATION TO CONTROL CURSOR POSITION

(75) Inventor: Matthew A. Silber, Beaverton, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/430,280

(22) Filed: Oct. 29, 1999

(65) Prior Publication Data

US 2003/0043115 A1 Mar. 6, 2003

(51) Int. Cl.[7] .................................................. G09G 5/08
(52) U.S. Cl. ........................ 345/158; 345/156; 345/157
(58) Field of Search ................................. 345/156, 157, 345/166, 168, 158; 382/103, 236

(56) References Cited

U.S. PATENT DOCUMENTS

| 4,521,772 | A | * | 6/1985 | Lyon | 345/166 |
|---|---|---|---|---|---|
| 4,794,384 | A | * | 12/1988 | Jackson | 345/166 |
| 4,823,170 | A | * | 4/1989 | Hansen | 356/620 |
| 5,045,843 | A | * | 9/1991 | Hansen | 345/158 |
| 5,109,435 | A | * | 4/1992 | Lo et al. | |
| 5,168,531 | A | | 12/1992 | Sigel | 382/48 |
| 5,359,348 | A | * | 10/1994 | Pilcher et al. | 345/158 |
| 5,448,261 | A | * | 9/1995 | Koike et al. | 345/158 |
| 5,454,043 | A | | 9/1995 | Freeman | 382/168 |
| 5,594,469 | A | | 1/1997 | Freeman et al. | 345/158 |
| 5,864,334 | A | * | 1/1999 | Sellers | 345/168 |
| 6,008,837 | A | * | 12/1999 | Yonezawa | 348/15 |
| 6,079,862 | A | * | 6/2000 | Kawashima et al. | 364/167.6 |
| 6,101,276 | A | * | 8/2000 | Adiletta et al. | 382/236 |

FOREIGN PATENT DOCUMENTS

| EP | 0 571 702 A2 | 12/1993 |
|---|---|---|
| EP | 0 837 418 A2 | 4/1998 |
| EP | 866 419 A2 | 9/1998 |

OTHER PUBLICATIONS

John W. Richardson, Kelan C. Silvester and Marion H. Shimoda, U.S. Patent Application Serial No. 09/167,814 filed Oct. 7, 1998, entitled "Controlling a Pointer Using Digital Video".

* cited by examiner

Primary Examiner—Richard Hjerpe
Assistant Examiner—Kevin M. Nguyen
(74) Attorney, Agent, or Firm—Trop, Pruner & Hu, P.C.

(57) ABSTRACT

A cursor control system for a processor-based system may receive input commands through a digital camera. Displacements of the camera along two transverse axes may correlate to displacements of a cursor image on a display screen associated with the processor-based system. Thus, the camera may be utilized for image capture operations and likewise for controlling the processor-based system's cursor image. The camera may then function not only as a conventional camera but also as a pointing device.

20 Claims, 5 Drawing Sheets

USING VIDEO INFORMATION TO CONTROL CURSOR POSITION

BACKGROUND

This invention relates generally to processor-based systems and particularly to systems for controlling the cursor position on displays on such systems.

The cursor is a graphical user interface which indicates a focus for a processor-based system. One common cursor image is an arrow image which may be moved across a computer screen to select different items that provide input signals for software running on the system. The cursor may also be implemented by a technique in which text or other indicia are highlighted and the position of the highlighting may be moved. In either case, a particular item may be selected, usually by operating a pushbutton when the cursor image is associated with a particular selectable item.

Cursors are generally positioned using pointing devices. Conventional pointing devices include a mouse, a touchpad, a keypad, a roller ball or a touch screen.

A variety of computers send and receive streaming video. For example, processor-based systems may implement video conferencing using a tethered digital camera. In addition, cameras may be utilized for implementing Internet telephone calls as another example. Thus, it is common that a camera may remain operational while the user uses the system for other functions which may not involve video.

Despite the fact that there are a number of ways to provide cursor control signals and a variety of different pointing devices, there is continued interest in pointing devices which provide added advantages. One problem with existing cursor control or pointing devices is that they tend to be, to one degree or another, counterintuitive. To some degree motion of the pointing device, such as a mouse, does not correspond to the motion of the cursor on the screen. Thus, it would be desirable to link the motion in a more intuitive way with the motion of the cursor on the screen.

Another problem with many conventional pointing devices such as the mouse is that they are difficult to use in a confined space. For example in an airplane, relatively little room is available for the mouse. The mouse does not work well if it cannot be moved in a translating motion to a sufficient extent. Thus, it would be desirable to have better ways for operating pointing devices that work in confined spaces.

Thus, there is a continuing need for better ways to provide cursor controls especially in systems which use video cameras.

SUMMARY

In accordance with one aspect, a method of controlling a processor-based system includes receiving video information from a camera coupled to the system. Changes in the orientation of the camera are translated with cursor control signals.

Other aspects are set forth in the accompanying detailed description and claims.

DETAILED DESCRIPTION

Figure 1:
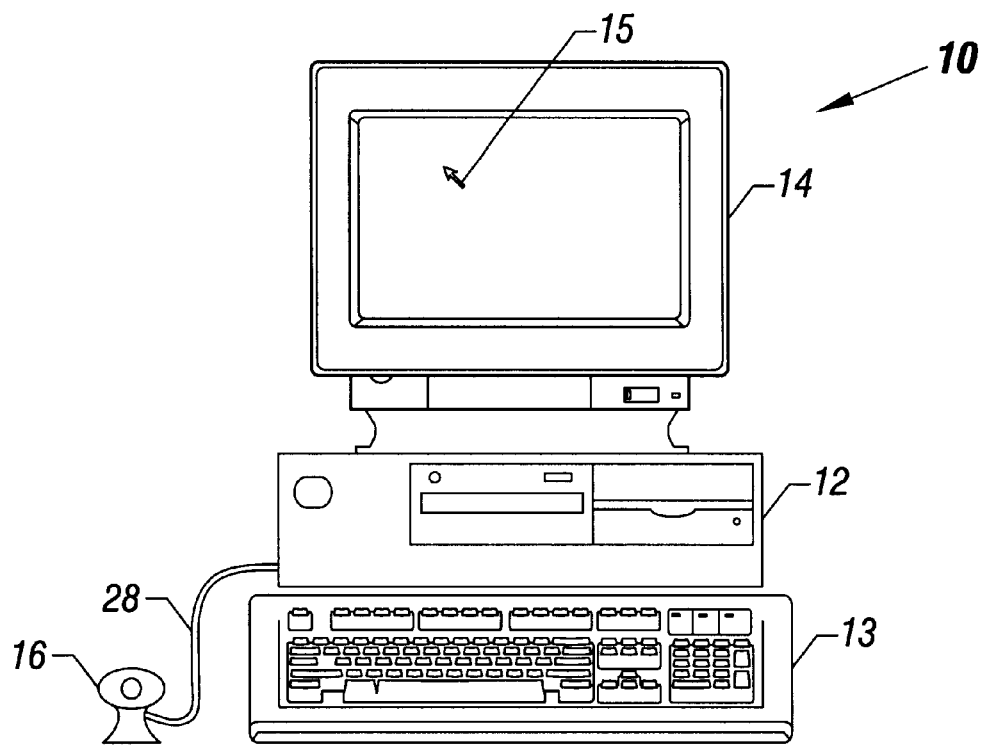
FIG. 1 is a front elevational view of one embodiment of the present invention.

A processor-based system 10, shown in FIG. 1, may include a processor housing 12, a keyboard 13 and a display 14. In addition, a digital camera 16 may be coupled to the system 10 by a cable 28. While a conventional desktop computer is shown, the present invention is applicable to processor-based systems in general, including laptop computers, processor-based appliances and set top computers as additional examples.

Figure 2:
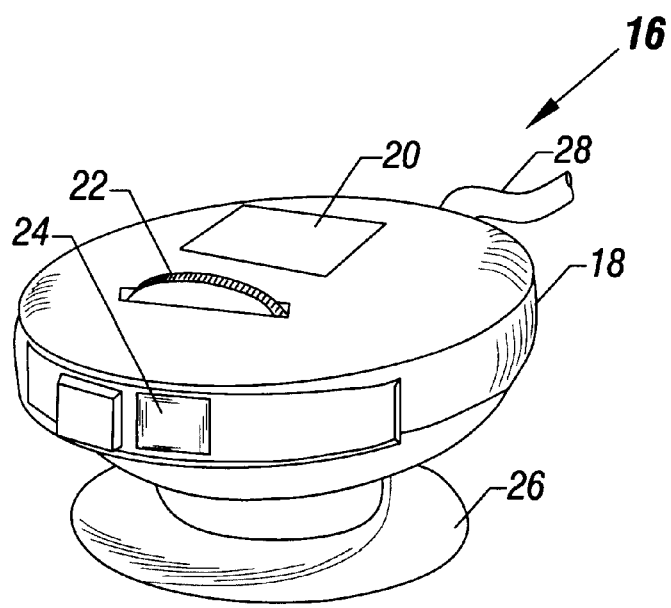
FIG. 2 is an enlarged perspective view of the digital camera shown in FIG. 1.

Turning next to FIG. 2, the digital camera 16, in accordance with one embodiment of the present invention, includes a housing 18 containing a camera lens 24. The housing 18 is supported for rotation about a base 26. In addition, the housing 18 may tilt up and down relative to the base 26. Thus, the housing 18 and the lens 24 may be redirected left or right and up and down.

The housing 18 also includes a focus adjustment knob 22. A pushbutton 20 may be used for a variety of purposes including generating an input command to capture a still image.

A wide variety of digital cameras may be utilized in connection with the present invention including those that use complementary metal oxide semiconductor (CMOS) imaging arrays as well as those that use charge coupled device (CCD) imaging arrays. The image captured by the camera 16 may be transferred over the cable 28 to the processor-based system 10. However, in other embodiments, a processor may be included within the camera itself and in such cases, the camera may include its own processor-based system.

Figure 3:
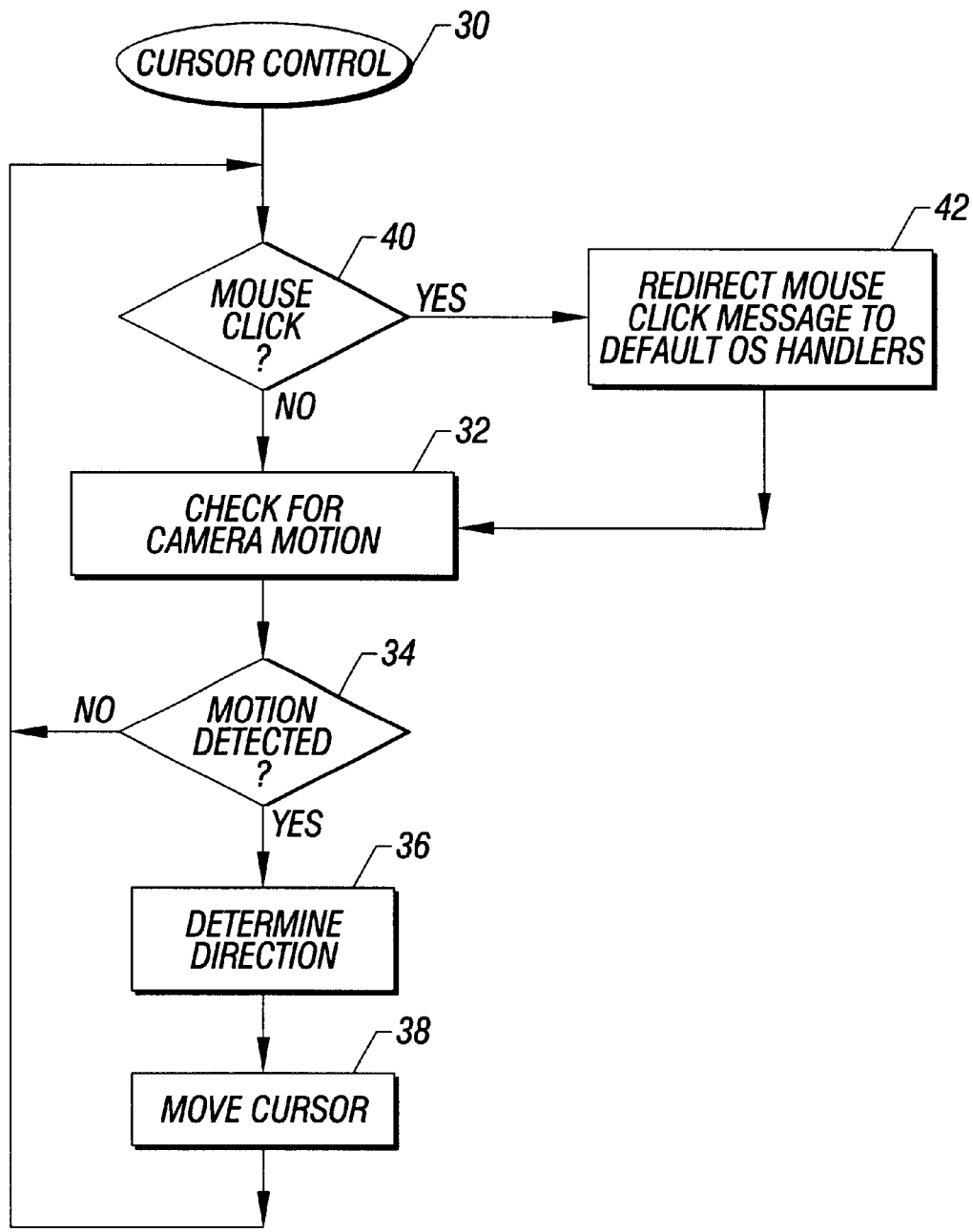
FIG. 3 is a flow chart for software for implementing one embodiment of the present invention.

Cursor control software 30, stored on the system 10, operates when a cursor input command is received (diamond 40). The software 30 checks for camera displacement as indicated in block 32 of FIG. 3. The displacement of the camera may be provided by the user to create a cursor control signal in one of at least two ways. The user can simply physically pick up the camera and turn it left or right or up or down, as examples, to cause cursor displacement to be recognized by the processor-based system. This provides a very intuitive way of providing cursor commands. In addition it is amenable to use in relatively confined spaces.

Alternatively, the cursor commands can be implemented by displacing the camera while it is positioned on a surface such as a desk. In this way, the camera housing 18 may be pivoted relative to the base 26. Again, a wide range of motion is possible and in this alternative, the cursor commands can be implemented by displacing the camera while it is positioned on a surface such as a desk.

A check at diamond 34 determines whether camera motion has been detected. If so, the direction of the motion is determined as indicated in block 36. A cursor image 15 (FIG. 1) is moved in accordance with the determined direction of camera motion, as indicated in block 38.

If a mouse click is received as detected in diamond 40, the mouse click message is redirected to a default operating system handler to implement a mouse button select feature (block 42). The mouse click may be an indication to select an item associated with the cursor or initiate other action in software. The mouse click signal may be generated in response to operation of the pushbutton 20 in one embodiment of the present invention.

Thus, the camera 16 may operate as a conventional mouse wherein the user can simply turn and tilt the housing 18 with respect to the base 26 thereby changing the direction which the camera lens 24 points. This change in orientation may be detected and a direction of motion may be determined. This information can be translated into cursor control signals. That is, a turn to the left may cause the mouse cursor to move to the left and so on. The extent of motion may determine the extent of movement of the cursor. Likewise, when the cursor is associated with a selectable item on the display screen 14, operation of the pushbutton 20 works similarly to the operation of a conventional mouse button, causing the item to be selected as an input command to software operating on the system 10.

Figure 4:
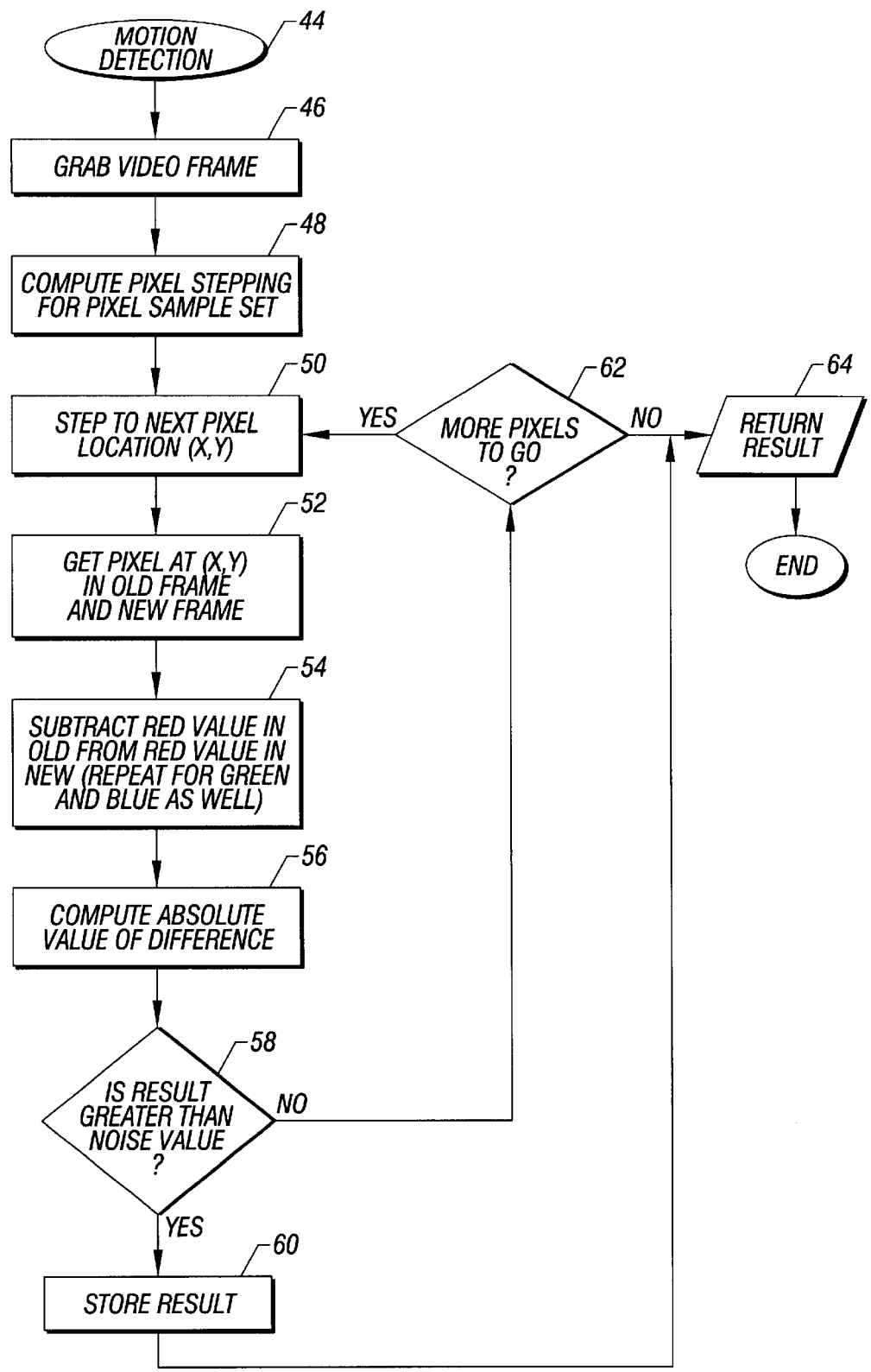
FIG. 4 is a flow chart for software which may be used to implement one of the features illustrated in the software shown in FIG. 3, in accordance with one embodiment of the present invention.

Referring next to FIG. 4, one embodiment of the software 44 for detecting motion begins by grabbing a video frame as indicated in block 46. A pixel sample set is selected for detecting motion. This is for processing convenience. That is, by selecting a pixel sample set for analysis, the analysis is simplified since every pixel in the camera's imaging array need not be separately analyzed.

A variety of techniques may be utilized to determine the sample set. In one embodiment of the present invention, the sample set may be a rectangular array of pixels which is generally centrally disposed on the imaging array and which produces a centrally located rectangular portion of the image displayed on the display screen. Even within that sample set, instead of taking every single pixel, a limited number of pixels may be analyzed in one embodiment of the invention. For example, in one embodiment of the invention, every fourth pixel may actually be analyzed as part of the sample set.

As indicated in block 50, each pixel within the sample set may be successively selected. As indicated in block 52, a corresponding pixel in an old or previous frame and a new frame are accessed. Their corresponding values are then subtracted as indicated in block 54. The values, depending on the model used, can represent RGB color information or a number of other color spaces including the YUV color space, the HSV color space, the YIQ color space, and the YDrDb color space, as additional examples, which have color values which may be utilized in the fashion described herein. Thus, in an example which uses a red, green, blue (RGB) color model, the red values in the old frame are subtracted from the red values in the new frame and so on. The absolute value of the differences is computed as indicated in block 56.

If the result exceeds a noise threshold (as indicated in diamond 58), the result may be stored as indicated in block 60. In some embodiments of the present invention, the noise threshold may be set by the user. If the result does not exceed the noise threshold, the flow continues to step through ensuing pixels in the sample set. When no more pixels are left to be analyzed (diamond 62), the result is returned as indicated in block 64. Particularly, as indicated in diamond 34 in FIG. 3, if motion is detected, the flow continues to determine its direction. Thus, a result determined by the flow shown in FIG. 4 may be returned to the flow illustrated in FIG. 3.

Once it is known that the camera 16 has been displaced, the next step is to determine the direction of displacement of the camera. In some embodiments of the present invention, this may be done relatively roughly since the direction may be repeatedly determined in very quick succession. For example, in one embodiment of the present invention, the direction may be recalculated with each frame. Many digital cameras operate at 30 frames per second. Thus, the system need only make a relatively rough estimate of the direction and if the estimate is wrong, it will be corrected with ensuing frames.

Figure 5:
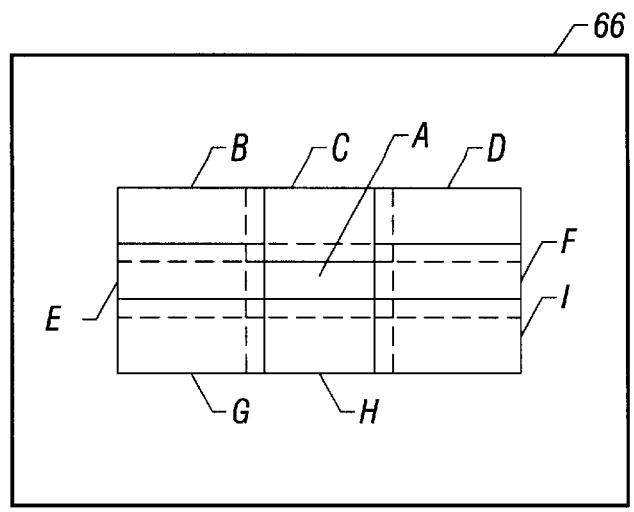
FIG. 5 is a schematic depiction of the pixel samples which may be utilized to determine the direction of camera movement in accordance with one embodiment of the present invention.

Thus, referring to FIG. 5, the initial sample set A for the first frame 66 is analyzed. The software determines which of the sets B through I most closely corresponds to the image which was previously recorded as the set A. In this way, the system can create a vector for the direction of camera displacement. This displacement is utilized to incrementally displace the cursor image on a display screen.

Figure 6:
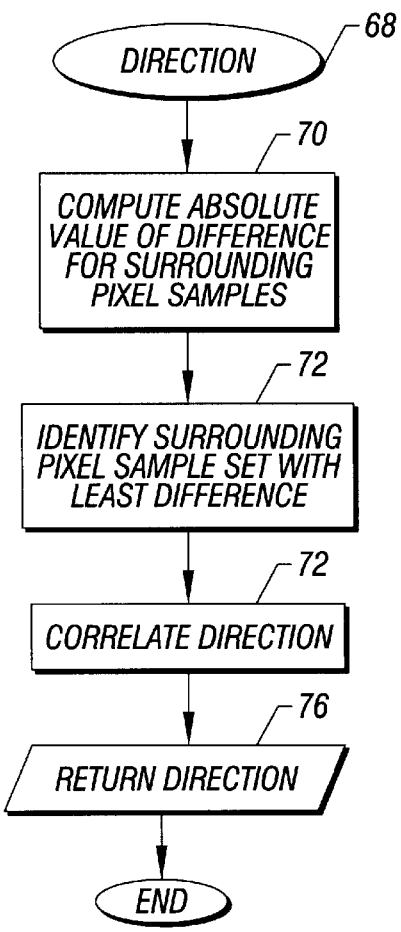
FIG. 6 is a flow chart for software which may be utilized in connection with the software illustrated in FIG. 3 in one embodiment of the present invention.
Figure 7:
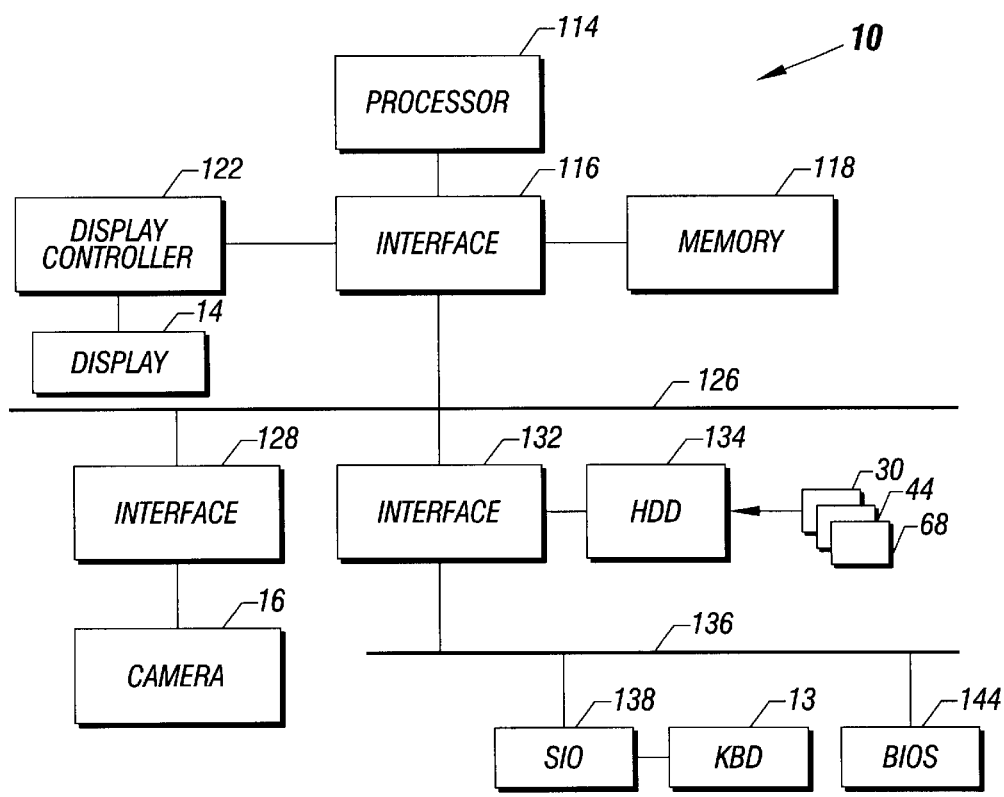
FIG. 7 is a block diagram for the system shown in FIG. 1.

The software 68 for determining the camera displacement direction in accordance with one embodiment of the present invention, shown in FIG. 6, begins by computing the absolute value of the difference for surrounding pixel sample sets from the previous frame. Once it is known that the camera has been displaced, for the new frame the same calculation is undertaken for each of a plurality of sample sets (such as samples sets B through I), each of which may correspond in size to the initial sample set A. The sample set (such as the samples sets B through I from the previous frame) whose computed value most closely corresponds to the value of the set A in the next or current frame is judged to be the displaced position of the image now recorded as set A. A vector is generated which indicates the direction of movement of the cursor. Thus, if the displaced position in the previous frame is the block C, the cursor is displaced downwardly and so on.

While a simple example has been used which uses nine fixed blocks B through I and compares them with respect to a block A, those skilled in the art will appreciate that a number of other variations are possible. For example, instead of using nine spaced blocks within a central region of the frame, any number of blocks may be iteratively compared and generated. Thus, software may be utilized to generate any desired number of blocks to reduce the granularity of the cursor movements.

In addition, instead of using only a central region of the frame, the entire region of the frame may be scanned for similarities. Similarly, instead of using blocks of fixed size, blocks of variable size may be utilized.

In still other embodiments, algorithms may be utilized to speed the comparison process. For example, in one embodiment, a comparison may be made with between two blocks and a value determined. When the next block exceeds the value already determined for the first block, the calculation is stopped and that comparison moves on to the next block. Other algorithms are known by those skilled in the art to speed comparison processes of this type, reducing the number of calculations and therefore the calculation time.

In some embodiments of the invention, the cursor image is always moved by the same finite amount and the only thing that changes is its direction of movement. Since this finite amount is generally a very small movement (for example, corresponding to a displacement occurring in $\frac{1}{30}$ of a second), the cursor image generally follows the correct direction of camera movement. The associated processor-based system calculates the successive vector displacements.

For the next frame, the analysis may again compare the new center sample set A with the previous frames surrounding sample sets, such as the sample sets B–I. A new vector is again determined. In one embodiment, the cursor image may always move a fixed amount (if motion is detected) and it is only the direction of the cursor movement that changes.

The system 10 may be implemented by a processor 114 which may be contained within the housing 12. The processor 114 may be coupled to an interface 116 which may be, for example, a bridge or chipset. The interface 116 couples the memory 118 and a display controller 122. The display controller 122 is coupled to the display 14.

The interface 116 is also coupled to a bus 126 which is in turn coupled to interfaces 128 and 132. The interface 128 couples the camera 16. The interface 132 may be coupled to a storage device such as a hard disk drive 134 which stores the software 30, 44 and 68.

A bus 136, coupled to the interface 132, is also coupled to a serial input/output (SIO) device 138 and a basic input/output system (BIOS) 144. The keyboard 13 may be coupled through the SIO 138.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method of controlling a processor-based system comprising:
   receiving a current video frame from a camera coupled to said system;
   comparing the current video frame to an immediately preceding video frame; and
   if the difference between the current video frame and the immediately preceding video frame exceeds a predetermined noise threshold, then generating a cursor control signal responsive to displacement of the camera.

2. The method of claim 1 including receiving a mouse click signal provided by the user through the camera.

3. The method of claim 1 including translating changes in the orientation of the camera along two transverse axes.

4. The method of claim 1 further including determining whether the orientation of the camera has changed by analyzing the video information.

5. The method of claim 4 including analyzing less than all the pixels captured by the camera to determine whether the orientation of the camera has changed.

6. The method of claim 1 including linking camera displacement in a given direction to displacement in the same direction of a cursor.

7. The method of claim 6 including translating the extent of movement of the camera with the extent of movement of the cursor.

8. An article comprising a medium for storing instructions that cause a processor-based system to:
   receive a current video frame from a camera coupled to the system;
   compare the current video frame to an immediately preceding video frame to determine a difference value; and
   if the difference value exceeds a predetermined noise threshold, then generate a cursor control signal responsive to displacement of the camera.

9. The article of claim 8 further storing instructions that cause a processor-based system to receive a mouse click signal provided by the user through the camera.

10. The article of claim 8 further storing instructions that translate changes in the orientation of the camera along two transverse axes.

11. The article of claim 8 further storing instructions that cause a processor-based system to determine whether the camera orientation is changed by analyzing the video information.

12. The article of claim 11 further storing instructions that cause a processor-based system to analyze less than all the pixels captured by the camera to determine whether the camera orientation has changed.

13. The article of claim 8 further storing instructions that cause a processor-based system to link camera displacement in a given direction to displacement in the same direction of the cursor.

14. The antic of claim 13 further storing instructions that cause a processor-based system to correlate the extent of movement of the camera with the extent of movement of the cursor.

15. A processor-based system comprising:
   a processor;
   a storage coupled to said processor;
   a camera coupled to said processor; and
   software stored on said storage to generate a difference value derived, in part, from a comparison of a current video frame to an immediately preceding video frame to generate a cursor control signal responsive to displacement of said camera.

16. The system of claim 15 wherein said camera includes a pushbutton, said pushbutton operating as a mouse select button.

17. The system of claim 15 wherein said camera includes a base and a lens, and said camera lens is pivotable in three dimensions about said base.

18. The system of claim 15 wherein said cursor control signal is generated as a result of the analysis of video information captured by said camera.

19. The system of claim 18 wherein said software analyzes less than all of the pixels captioned by said camera.

20. The system of claim 18 wherein the extent of movement of said camera controls the extent of cursor movement.

* * * * *

UNITED STATES PATENT AND TRADEMARK OFFICE
CERTIFICATE OF CORRECTION

PATENT NO. : 6,738,041 B2
DATED : May 18, 2004
INVENTOR(S) : Matthew A. Silber

It is certified that error appears in the above-identified patent and that said Letters Patent is hereby corrected as shown below:

<u>Column 6,</u>
Line 30, "antic" should be -- article --.

Signed and Sealed this

Thirteenth Day of July, 2004

JON W. DUDAS
*Acting Director of the United States Patent and Trademark Office*